April 21, 1964

J. S. IVAN ETAL 3,129,504

METAL FABRICATION

Filed Oct. 24, 1960

INVENTORS.
Joseph S. Ivan
Lawrence A. Gould
Robert C. Austin
BY Robert B. Ingraham
AGENT

United States Patent Office 3,129,504
Patented Apr. 21, 1964

3,129,504
METAL FABRICATION
Joseph S. Ivan, Midland, Lawrence A. Gould, Bay City, and Robert C. Austin, Midland, Mich., assignors to The Dow Chemical Company, Midland, Mich., a corporation of Delaware
Filed Oct. 24, 1960, Ser. No. 64,399
3 Claims. (Cl. 29—529)

This invention relates to a method of preparing composite metallic articles and more particularly relates to a method of preparing composite metallic articles having a land comprised of a deposited hard surfacing alloy.

Frequently it is advantageous to fabricate shaped metallic articles having lands exhibiting a high resistance to wear and abrasion. This is usually accomplished by fabricating the main body of a shaped metallic article from a relatively soft base material such as, for example, steel, nickel alloys, and the like, and subsequently depositing in overlay on the surface of the article. Such overlays are usually deposited by conventional welding methods such as by the use of the oxygen acetylene flame, electric arc welding employing a coated electrode, and by inert gas arc welding procedures. These conventional procedures are eminently satisfactory for such operations as hard facing bucket teeth, scraper blades, screw conveyors, plow points, and such similar items wherein dimensional tolerances are not critical.

The hard facing alloys are deposited in molten form. The resultant deposit is incapable of being placed on a metallic substrate in such a manner that a sharp edge or a shoulder is formed. The molten hard surfacing alloy is generally drawn into an arcuate configuration during deposition because of its high surface tension. Therefore, if a small land, having a generally rectangular or square configuration and cross-sectional dimensions of, for example, approximately ⅛ inch high and ⅛ inch wide, under optimum conditions must be shaped by grinding, from a hard surfacing alloy deposit having a generally cross-sectional configuration, under optimum conditions, about one-quarter of an inch wide and about three sixteenths of an inch high. The hard facing alloys frequently employed for abrasion resistance are sufficiently hard that they are not machinable and must be shaped by grinding. Because of hardness of such alloys (typically from 50 to 65 Rockwell C) grinding is a relatively expensive and time-consuming operation.

It would be advantageous if there were available a method that would permit the formation of hard surfaced lands which would minimize the quantity of hard surfacing alloys to be deposited.

It would be further advantageous if a method were available which would permit a land of hard surfacing to be formed to desired dimension with a minimum amount of grinding required.

It would also be advantageous if such a method were available which would require a minimum flow control of the hard surfacing material when applied.

These benefits and other advantages may be readily achieved by a method for preparing a shaped metallic article having at least one hard surfaced land which comprises (a) forming in a metallic base stock by a groove corresponding generally in size and location to the portion of the desired hard surfaced portion of said land; (b) depositing a hard surfacing alloy in said groove and (c) subsequently removing a portion of the metallic base stock thereby providing a hard surfaced land.

Further features and advantages of the invention will be more apparent in the following description and specification when taken in connection with the accompanying drawings wherein.

Figure 1:
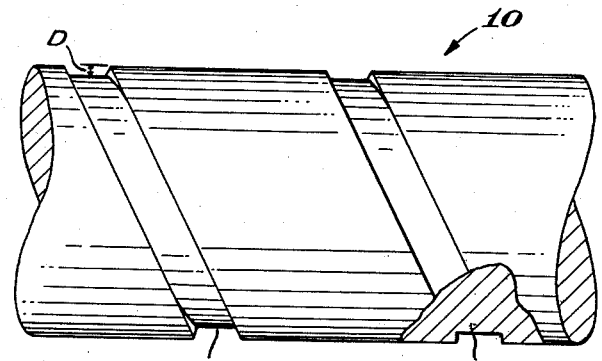
FIGURE 1 is a longitudinal partly in section view of a portion of a metallic base stock having a helical groove formed therein.

In FIGURE 1 there is illustrated a longitudinal, partly in section view of a portion of circular bar generally designated by the reference numeral 10. The helical groove 12 is machined in the surface of bar 10. The depth of the groove designated by the dimension D roughly approximates the thickness of weld deposit desired.

Figure 2:
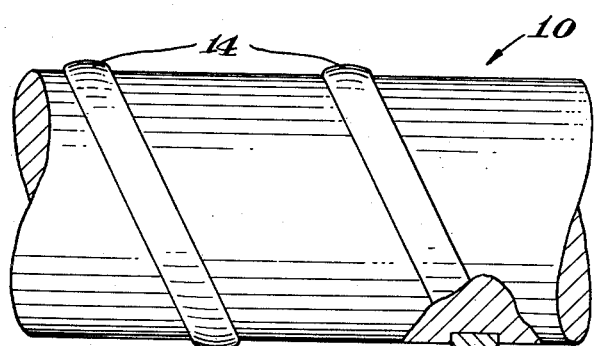
FIGURE 2 is a longitudinal partly in section view of a portion of base material of FIGURE 1 having hard surfacing material deposited therein.

In FIGURE 2 the helical groove 12 of FIGURE 1 is filled with a hard surfacing deposit 14.

Figure 3:
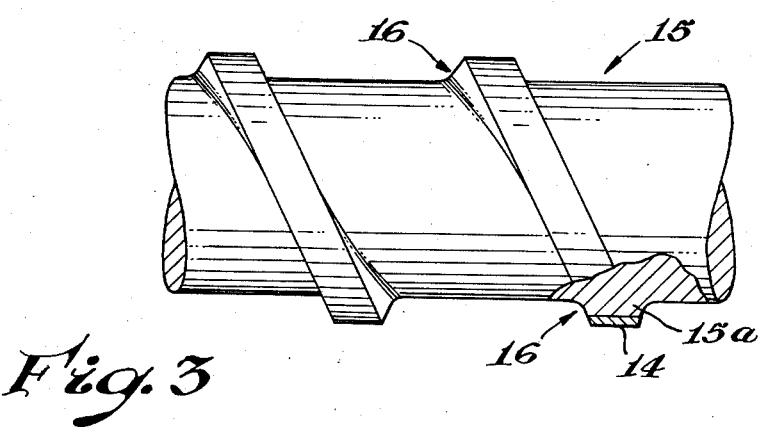
FIGURE 3 is a longitudinal partly in section view of a section of FIGURE 2 after excess material has been removed.

In FIGURE 3 a similar partly in section view is shown of a section generally designated by the reference numeral 15 of a completed screw having hard surfaced lands 16, the hard surface lands 16 composed of 2 portions, the hard surfacing deposit 14, and the base metal 15a.

In operation the invention is readily practiced, as may be fully appreciated, by the following general description of the fabrication of an extruder screw.

A section of bar 10 is selected having a total diameter approximately equal to the diameter of the finished screw 15. A helical groove 12 is cut into the surface of the bar corresponding to the desired location of the lands 16. The hard surfacing deposit 14 is then placed in grooves 12 by any conventional welding method. Advantageously, especially clean and controlled deposits may be obtained when inert gas arc welding is employed, such as the method generally known as "Heliarc," although conventional coated electrode arc welding techniques may be employed as well as oxygen acetylene, oxygen hydrogen, and the like.

Generally, it is advantageous to employ a single pass technique using only sufficient heat to obtain a good bond and a minimum penetration in order to avoid dilution of the hard overlay 14 with the base metal and subsequent softening of hard surface alloy, although in some cases multiple pass technique may be employed. Usually, when making relatively small lands, for example, less than ⅜ of an inch in width, it is frequently beneficial to employ inert arc welding to deposit the hard surfacing alloys. Tungsten inert arc welding is frequently highly advantageous, as the heat distribution is substantially less than when employing flame deposition of hard surfacing alloys and the hard surfacing deposit conforms more closely to the contour of the originally machined helical groove. By employing an automatic welding process a constant speed of deposit is maintained and warpage is substantially reduced.

After the hard surfacing deposit 14 has been placed in the grooves 12 the excess material between the spiral of hard surfacing deposit 14 may be removed by any one of the conventional methods such as turning, milling, grinding, spark machining and the like. Usually the procedure employed is to (a) rough turn the screw to about 0.035 inch larger than the desired dimension; (b) rough grind the screw between the lands or thread; (c) finish grind the soft material between the lands; (d) finish grind the edges of the lands, and (e) subsequently grind the hard surfaced overlay to finished outside dimension.

The method of the invention is particularly applicable to extruder screws employed for plastics processing purposes. Screws fabricated according to the invention are of great benefit when employed for the processing of plastics containing abrasive filler materials and the like.

Relatively close dimensional tolerances must be held between screw 15 and the generally cylindrical barrel within it which operates. The method of the invention is readily applied to extruder screws and similar articles both large and small, i.e., from about less than 1 inch to an excess of 6 inches in diameter with great advantage.

As is apparent from the foregoing specification, the method of the present invention is susceptible of being embodied with various alterations and modifications which may differ particularly from those that have been described in the preceding specification and description. For this reason it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of preparing a screw having at least one helically disposed hard surfaced land comprising (a) in a cylindrical metal bar having a diameter about as large as the desired screw, forming a helical groove in the cylindrical surface of said bar, said groove corresponding generally in size and location to the desired land; (b) depositing in said groove by a welding method a hard surfacing alloy; (c) removing a sufficient portion of the metal bar and any undesired hard surfacing alloy to form a screw having a hard surfaced helical land, said land extending generally radially outward from the surface of the bar.

2. A method in accordance with claim 1 wherein said screw is an extruder screw.

3. A method in accordance with claim 1 wherein said hard surfacing alloy is deposited continuously and at a uniform rate in said groove.

References Cited in the file of this patent

UNITED STATES PATENTS

| | | |
|---|---|---|
| 1,820,240 | Michell | Aug. 25, 1931 |
| 1,939,080 | Pickard | Dec. 12, 1933 |
| 1,999,599 | Smith | Apr. 30, 1935 |
| 2,250,561 | Wissler | July 29, 1941 |

FOREIGN PATENTS

| | | |
|---|---|---|
| 470,688 | Canada | Jan. 9, 1951 |

OTHER REFERENCES

"American Machinist" November 13, 1940 pages 922–923, "Reclaiming Locomotive-Stoker Screws" by Arthur Havens.